UNITED STATES PATENT OFFICE.

WILLIAM H. SMITH, OF PHILADELPHIA, PENNSYLVANIA.

IMPROVEMENT IN UTILIZING SLAGS OF FURNACES.

Specification forming part of Letters Patent No. 9,459, dated December 7, 1852.

*To all whom it may concern:*

Be it known that I, WILLIAM H. SMITH, of the city and county of Philadelphia, State of Pennsylvania, have invented a new method of utilizing those vitrifiable compounds produced during the reduction of metals called "slag or scoria,"—viz., their manufacture into a new class of wares, which I denominate "lava-ware;" and I do hereby declare that the following is a full and exact description of the above invention.

I use for one class of manufactured articles—viz., tiles, plates, and all such articles of solid and hollow ware as can be easily molded and pressed—the molten slag as it is ejected from the reducing-furnace by operating therefrom all unfused scoria and uncombined gas, and mixing it with such alkalies and metals as may be requisite to soften it and change its color, and then by casting it into suitable molds and rolling, pressing, grinding, polishing, &c., after the manner of glass-works.

For blown ware and the finer qualities of pressed ware I use the slag after it has been more carefully refined, softened, and colored; and I apply, in making such and like vitreous manufactures, a compound reverberating furnace consisting of a succession of sandstone or fire-clay beds or compartments heated by the same fire, so as to obtain various degrees of heat in the succeeding compartments, by which the more easily fused matter may be simultaneously worked with those more difficult of fusion in the same range of furnace in order to work various qualities and colors of vitreous material with comparatively little expenditure of fuel.

In this reverberating furnace I subject the molten slag to such a degree of heat as may be sufficient to keep it in a state suitable for the operations of blowing, casting, &c. I also soften and color the slag therein and then blow the slag so refined into ware, out of suitable openings in the reverberating furnace, using said reverberatory as a substitute for the pots used for melting and blowing glass. If, as is often the case, the quality of the slag is not sufficiently good to admit of its flowing from the blast-furnace into the reverberatory in its molten state, I cool the slag or solidify it in thin sheets or layers by pouring it upon metallic plates, or by other suitable methods so chill the slag as to separate its vitreous particles from those which are not vitreous, thereby forming a product which, when remelted, forms a refined and purified material suitable for being manufactured into bottles and all kinds of blown and pressed ware. Again, if the slag be combined with too much metal, or it becomes necessary to separate it from its metallic ores, I smelt such material in one chamber of the reverberating furnace and cause the separated slag to flow from the melted ore into an adjacent chamber of the furnace out of which it is worked by blowing.

In annealing lava-ware it is necessary to use for most articles a regular, intense, and long-continued heat, and also at times to cover the ware with clay, ashes, soapstone, sand, &c., both to protect it from sudden cooling, and vary its color, texture, and degree of hardness and vitrification.

What I claim as my invention, and desire to secure by Letters Patent, so as to have the exclusive right therein, is—

The process of utilizing the slags of iron and other like furnaces, refining and working of the same, substantially in the manner and for the purposes set forth in the specification, whereby I bring into successful operation for useful purposes a class of hitherto useless products.

WILLIAM H. SMITH.

Witnesses:
CHARLES D. FREEMAN,
O. H. FISLER.